United States Patent
On et al.

(10) Patent No.: US 9,380,639 B2
(45) Date of Patent: *Jun. 28, 2016

(54) SELF-ORGANIZATION NETWORK ARCHITECTURES FOR HETEROGENEOUS NETWORKS

(71) Applicant: AirHop Communications, Inc., San Diego, CA (US)

(72) Inventors: Hanson On, Escondido, CA (US); Douglas McPherson, San Diego, CA (US); Zaijin Guan, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,369

(22) Filed: Feb. 5, 2015

(65) Prior Publication Data

US 2015/0223287 A1    Aug. 6, 2015

Related U.S. Application Data

(63) Continuation of application No. 13/630,237, filed on Sep. 28, 2012, now Pat. No. 8,983,453.

(60) Provisional application No. 61/541,979, filed on Sep. 30, 2011.

(51) Int. Cl.
| | |
|---|---|
| *H04W 84/18* | (2009.01) |
| *H04W 24/02* | (2009.01) |
| *H04W 16/18* | (2009.01) |
| *H04W 84/04* | (2009.01) |

(52) U.S. Cl.
CPC .............. *H04W 84/18* (2013.01); *H04W 16/18* (2013.01); *H04W 24/02* (2013.01); *H04W 84/045* (2013.01)

(58) Field of Classification Search
CPC ..... H04W 24/02; H04W 92/20; H04W 88/08; H04W 36/0011
See application file for complete search history.

(56) References Cited

U.S. PATENT DOCUMENTS

| | | | | |
|---|---|---|---|---|
| 7,383,057 | B1 * | 6/2008 | Senarath | H04L 1/0026 455/127.1 |
| 2010/0046433 | A1 * | 2/2010 | Iwamura | H04W 92/045 370/328 |
| 2011/0028181 | A1 * | 2/2011 | Byun | H04W 36/0083 455/525 |
| 2011/0045835 | A1 * | 2/2011 | Chou | H04L 41/0806 455/446 |
| 2011/0076969 | A1 * | 3/2011 | Ericson | H04W 4/20 455/126 |

* cited by examiner

*Primary Examiner* — Curtis A Alia
(74) *Attorney, Agent, or Firm* — Van Pelt, Yi & James LLP

(57) ABSTRACT

Self-Organized Network (SON) architectures for heterogeneous networks are disclosed. In some embodiments, various SON architectures for heterogeneous networks are provided that can evolve with such networks while the core functional modules of the SON solution can remain the same. In some embodiments, techniques for implementing SON architectures for heterogeneous networks includes providing a base station that includes performing a pre-operation self-configuration; and performing an operation self-optimization.

23 Claims, 11 Drawing Sheets

US 9,380,639 B2

SELF-ORGANIZATION NETWORK ARCHITECTURES FOR HETEROGENEOUS NETWORKS

CROSS REFERENCE TO OTHER APPLICATIONS

This application is a continuation of co-pending U.S. patent application Ser. No. 13/630,237, entitled SELF-ORGANIZATION NETWORK ARCHITECTURES FOR HETEROGENEOUS NETWORKS filed Sep. 28, 2012, which claims priority to U.S. Provisional Patent Application No. 61/541,979, entitled SELF-ORGANIZATION NETWORK ARCHITECTURES FOR IMPLEMENTATION filed Sep. 30, 2011, both of which are incorporated herein by reference for all purposes.

BACKGROUND OF THE INVENTION

Heterogeneous networks are becoming an important deployment strategy for data centric wireless networks (e.g., 3G and 4G cellular networks) to address capacity and throughput issues. Heterogeneous networks generally include base stations with different radio access technologies (e.g., 3G and 4G), coverage ranges, capacities (e.g., macrocell, picocells, and femtocells) and channel bandwidths (e.g., 2.5 MHz, 5 MHz, 10 MHz, and 20 MHz). This heterogeneous nature made the deployment, operation, administration, maintenance, and provisioning of such heterogeneous networks significantly more challenging as compared with homogeneous networks.

BRIEF DESCRIPTION OF THE DRAWINGS

Various embodiments of the invention are disclosed in the following detailed description and the accompanying drawings.

DETAILED DESCRIPTION

Figure 1:
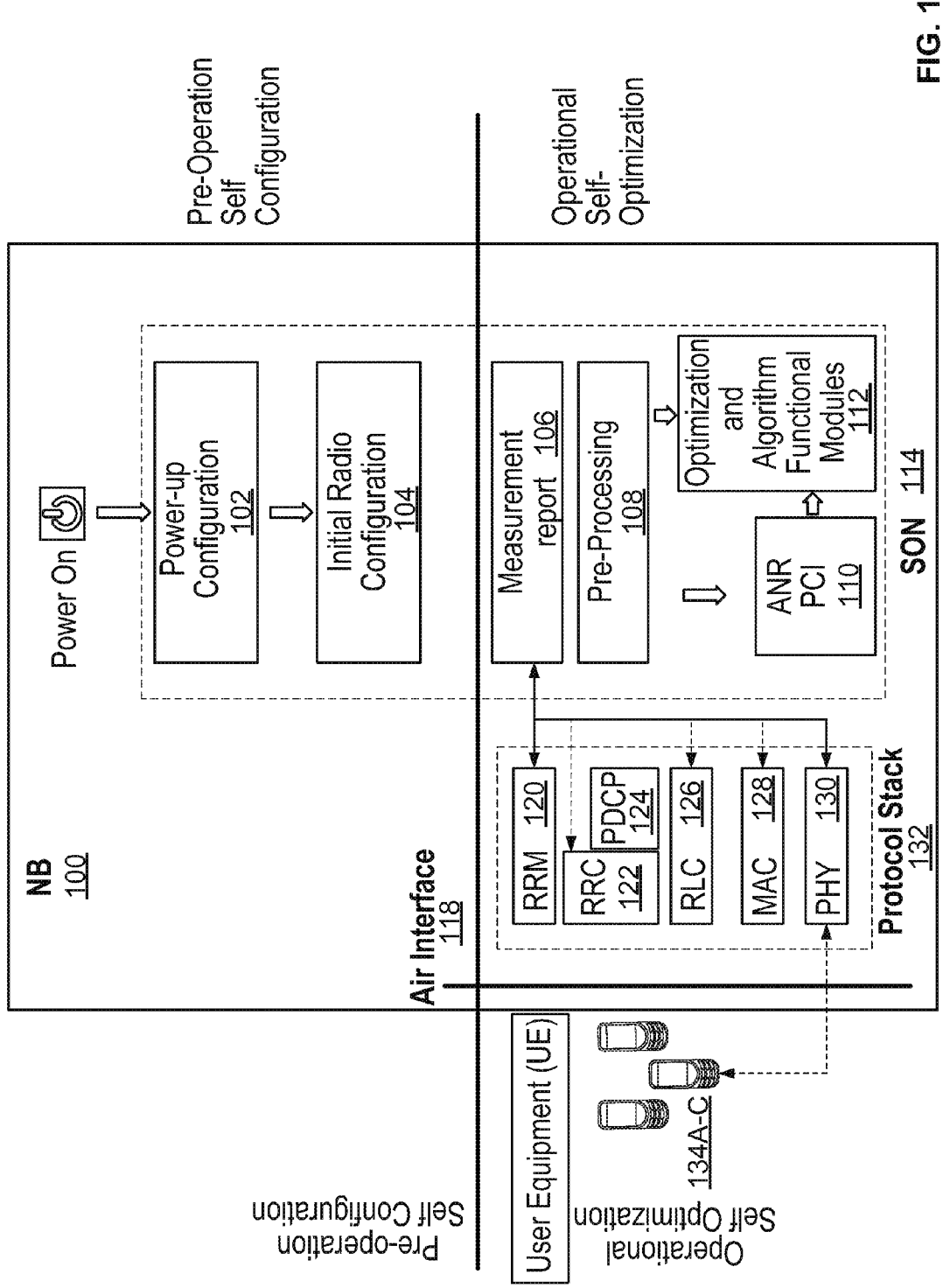
FIG. 1 illustrates a functional diagram of a 3G UMTS implementation architecture for autonomous distributed Self-Organized Network (SON) deployment in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As cellular networks continue to evolve, heterogeneous networks are becoming increasingly important with greater usage of smaller cells, such as picocells and femtocells. However, while macrocells were well planned and controlled by cellular providers, the greater usage of these smaller cells, which are less planned and centrally controlled (e.g., different enterprise users and consumer users can provide and use such smaller cells), there is an increasingly likelihood of cellular overlap. As a result, fully autonomous modes of operation of macrocells and smaller cells is less desirable as there can be cellular overlap resulting in various radio resource overlap and interference. Accordingly, there is a need to provide improved coordination and intelligent radio resource usage among various nodes (e.g., smaller cells) in heterogeneous networks using SON techniques (e.g., among clusters of nodes, using autonomous mode techniques, using peer-to-peer techniques, and/or using server assisted techniques to facilitate centrally coordinating, the implementation of optimization parameters for radio resources for each node in a cluster).

Heterogeneous networks are becoming an important deployment strategy for data centric wireless networks (e.g., 3G and 4G cellular networks) to address capacity and throughput issues. Heterogeneous networks generally include base stations with different radio access technologies (e.g., 3G and 4G), coverage ranges, capacities (e.g., macrocell, picocells, and femtocells) and channel bandwidths (e.g., 2.5 MHz, 5 MHz, 10 MHz, and 20 MHz). This heterogeneous nature of heterogeneous networks has made the deployment, operation, administration, maintenance, and provisioning of such heterogeneous networks significantly more challenging as compared with homogeneous networks. For example, some of the key challenges include the following: (a) deployment: overlapping footprints can cause significant interference issues (e.g., in some cases the overlap can be 100%); (b) operation and provisioning: spectrum scarcity demands frequency reuse (e.g., macrocell and small cells sharing spectrum); and (c) administration and maintenance: interference related issues (e.g., poor quality of service and dropped calls can be seen in many of the ongoing deployment trials).

Self-Organized Network (SON) has become a requirement to facilitate the deployment, operation, maintenance, and provisioning of heterogeneous networks. However, the existing SON solutions are platform dependent and address mainly the configuration and provisioning issues. Accordingly, it is important to provide SON architectures that are independent from radio access technologies (e.g., 3G UMTS and 4G LTE) as well as platform hardware (e.g., chipsets, processors, circuit boards, and network interfaces) and software (e.g., Operating Systems, Board Support Packages, and protocol stacks). In addition, it is important to provide SON architectures that can address the need for deployment, operation, maintenance, and provisioning of heterogeneous networks.

SON solutions are typically defined and implemented based on some existing or known network topologies.

However, in today's heterogeneous wireless network, the topology of a heterogeneous network will evolve over time due to changing in network coverage requirements, capacity requirements, throughput requirements, Quality of Service (QoS) requirements, and/or various other requirements. For example, in the early phase of a heterogeneous network where the number base stations (e.g., NBs and eNBs) are small, capacity and throughput are adequate and inter-cell interference is minimal such that autonomous distributed SON deployment can be chosen for the ease of deployment and lower cost. As the capacity and throughput requirements increase, the number of base stations increases as well as inter-cell interference. Hence, the total capacity and throughput can, in fact, decrease due to the increased inter-cell interference. In this case, the SON deployment can migrate to coordinated distributed or coordinated hybrid deployment to better manage inter-cell interference and improve network performance. In other use cases, centralized SON deployment can be selected due to existing network management infrastructure.

Accordingly, various Self-Organized Network (SON) architectures for heterogeneous networks are disclosed. In some embodiments, various SON architectures for heterogeneous networks are provided that can evolve with such networks while the core functional modules of the SON solution can remain the same.

In some embodiments, techniques for implementing SON architectures for heterogeneous networks includes providing a base station that includes performing a pre-operation self-configuration; and performing an operation self-optimization.

In some embodiments, techniques for implementing SON architectures for heterogeneous networks includes providing a base station that includes autonomously performing a pre-operation self-configuration; and autonomously performing an operation self-optimization.

In some embodiments, techniques for implementing SON architectures for heterogeneous networks includes providing a base station that includes communicating with peer base stations to receive peer-to-peer radio configuration information for implementing a coordinated distributed Self-Organized Network (SON) deployment; and performing an operation self-optimization using the peer-to-peer radio configuration information. In some embodiments, the base station is a 4G base station that performs peer-to-peer communications using an X2-AP link of the base station.

In some embodiments, techniques for implementing SON architectures for heterogeneous networks includes providing a base station that includes communicating with a Self-Organized Network (SON) server for implementing a coordinated hybrid distributed SON deployment; and performing an operation self-optimization using radio configuration information received from the server. In some embodiments, the base station is a 4G base station that performs communications to the SON server using an X2-AP link of the base station. In some embodiments, the base station is a 4G base station that performs communications to the SON server using an S1-AP link of the base station. In some embodiments, the SON server is integrated with an Element Management Server (EMS).

FIG. 1 illustrates a functional diagram of a 3G UMTS implementation architecture (e.g., system level) for autonomous distributed Self-Organized Network (SON) deployment in accordance with some embodiments. In particular, FIG. 1 illustrates various SON functional modules implemented and integrated on the base station (NB) 100 interfacing with the protocol stack 132 of the NB software. As shown, the SON functional modules are divided into two functional states—pre-operation self-configuration and operational self-optimization. During the pre-operation self-configuration state, the SON functional modules power-up configuration 102 and initial radio configuration 104 handle initial power up configuration for the NB including, for example, backhaul link setup, transport network configuration, and radio network configuration (e.g., PCI conflict resolution, transmit power, etc.). Upon completing the pre-operation self-configuration, the SON functional modules enter an operational self-optimization state. During the operational self-optimization state, the SON functional modules measurement report 106, pre-processing 108, ANR (Automatic Neighbor Relation) and PCI (Physical Cell Identification) 110, and optimization and algorithm functional modules 112 performs real-time optimization by, for example, receiving various measurement reports and QoS requirements (e.g., from other base stations (NBs) and/or user equipments (UEs)), generating updated configuration parameters per optimization algorithms, and applying optimized configuration parameters. For example, optimization algorithms can reside on the NB to analyze receive measurement reports (e.g., measurement reports received from one or more neighbors and the NB's own Received Signal Strength Indicator (RSSI) and Channel Quality Indicator (CQI)), to determine a minimum amount of time and power needed per transmit period as optimized configuration parameters to meet its overall QoS requirements. Thus, the inter-cell interference is reduced by transmitting the proper amount of power with necessary duration.

As also shown in FIG. 1, NB 100 includes protocol stack 132. In some embodiments, the protocol stack includes a physical layer 130, a MAC layer 128, an RLC (Radio Link Control) layer 126, a PDCP (Packet Data Convergence Protocol) layer 124, an RRC (Radio Resources Control) layer 122, and an RRM (Radio Resources Manager) layer 120. As shown, RRM 120, RRC 122, RLC 126, MAC 128, and PHY 130 layers can each be in communication with the measurement report 106 of the SON functional modules. As also shown, NB 100 includes an AIR interface 118 for communication with other User Equipment (UE) 134A, 134B, and 134C.

Figure 2:
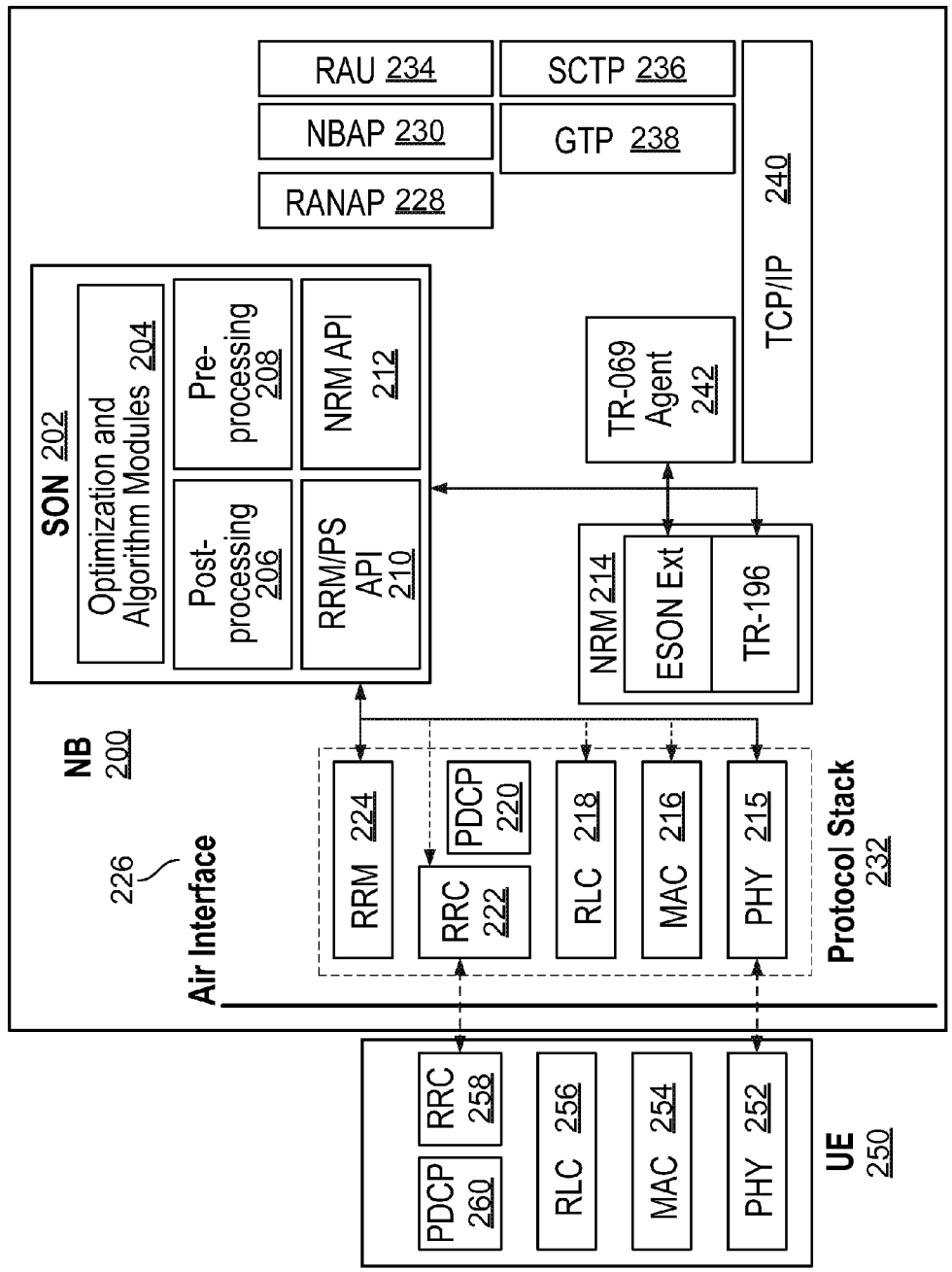
FIG. 2 illustrates 3G UMTS SON Application Programming Interfaces (APIs) for autonomous distributed SON deployment in accordance with some embodiments.

FIG. 2 illustrates 3G UMTS SON Application Programming Interfaces (APIs) for autonomous distributed SON deployment in accordance with some embodiments. In some embodiments, the SON deployment is distributed and operates autonomously. In particular, FIG. 2 illustrates a SON architecture in which the SON solution is implemented on a 3G NB in accordance with some embodiments. In some embodiments, the SON solution for autonomous distributed deployment, shown as SON software 202, includes five functional modules and one Network Resource Model (NRM) extension, shown as NRM 214. As shown, the five functional modules of SON 202 include optimization and algorithm modules 204, a Radio Resource Management/Protocol Stack (RRM/PS) API module 210, pre processing module 208, post processing module 206, and NRM API 212. In some embodiments, the RRM/PS API module 210 handles all the interaction between SON 202 and the Radio Resource Management (RRM) 224 and the Protocol Stack 232 of NB 200, such as measurement configuration, retrieving measurement reports and QoS requirements, radio resource constraints configuration, and various other functions and interactions. In some embodiments, the pre-processing module 208 prepares measurement reports and QoS requirements from the RRM/PS API module 210 as well as NRM parameters from the NRM API 212. In some embodiments, the optimization and algorithms module 204 performs various optimization procedures by exercising optimization algorithms on pre-processed measurement reports, QoS requirements, and NRM parameters from the pre-processing module 208. In some embodiments, the post-processing module 206 uses the results from the optimization and algorithms modules 204, formats such results in forms of radio resource constraints and configuration parameters, and then delivers the formatted results to corresponding protocol stack modules and the NRM API module 212. In some embodiments, the NRM API module 212 handles access for SON to an NRM data store 214 (e.g., NRM database). In some embodiments, the NRM database access includes standardized NRM (e.g., TR-196) and NRM extension (e.g., proprietary parameters) in communication with TR-069 agent 242, as shown.

As also shown in FIG. 2, NB 200 includes RANAP (Radio Access Network Application Part) 228, NBAP (Node B Application Part) 230, RAU (Routing Area Update) 234, SCTP (Stream Control Transmission Protocol) 236, GTP (GPRS Tunneling Protocol) 238, TCP/IP 240, and TR-069 agent 242. In some embodiments, NBAP provides cell configuration service between the NB 200 and CN (Core Network) including cell setup and reconfiguration, in which RRM (Radio Resource Management) 224 receives cell setup/reconfiguration parameters, such as cell identity, primary scrambling code, transmit power and stores these cell setup/reconfiguration parameters in NRM 214. For example, during an optimization process, optimization and algorithms modules 204 access cell setup/reconfiguration parameters via NRM API 212. RANAP provides the signaling service between NB 200 and the CN including RAB (Radio Access Bearer) management, in which RRM (Radio Resource Management) 224 receives RAB configuration/reconfiguration with specific QoS requirement for a UE (User Equipment) 250 to access the CN. RRM/PS API 210 registers with RRM for RAB configuration/reconfiguration events such that RRM notifies RRM/PS API 210 of QoS requirement due to RAB configuration/reconfiguration. RRM/PS API 210 delivers the QoS requirement to optimization and algorithms module 204 to update optimized parameters (e.g., transmit power and duration). Similarly, the pre-processing module 208 registers with MAC 216 for CQI (Channel Quality Indicator) from UE 250 such that MAC 216 notifies pre-processing module 208 upon CQI updates. Pre-processing module 208 processes the CQI (e.g., smoothing) and then delivers the processed CQI value to optimization and algorithms module 204 to update optimized parameters (e.g., transmit power and duration). The optimization and algorithms modules 204 store the latest optimized parameters to NRM 214 via NRM API 212. In addition, the optimization and algorithms module 204 can pass the latest optimized parameters to the RRM 224, MAC 216, and PHY 215, respectively. In some embodiments, the SON 202 is implemented with five independent functional modules, in which the RRM/PS API module 210 and NRM API module 212 handle information exchanging with the protocol stack 232 and NRM 214 native to NB 200. In some embodiments, the optimization and algorithms modules 204, pre-processing module 208, and post-processing module 206 interact with RRM/PS API module 210 and NRM API module 212 only and do not have to have any knowledge on native NB modules. This architecture and implementation makes the SON 202 highly portable to other NB platform. For example, when porting the SON 202 to a different NB platform, the changes are limited to RRM/PS API module 210 and NRM module 214.

As also shown in FIG. 2, NB 200 includes protocol stack 232. In some embodiments, the protocol stack includes a physical layer 215, a MAC layer 216, an RLC (Radio Link Control) layer 218, a PDCP (Packet Data Convergence Protocol) layer 220, an RRC (Radio Resources Control) layer 222, and an RRM (Radio Resources Manager) layer 224. As shown, RRM 224, RRC 222, RLC 218, MAC 216, and PHY 215 layers can each be in communication with the RRM/PS API module 210 of the SON functional modules 202. As also shown, NB 200 includes an AIR interface 226 for communication with UEs, such as shown, UE 250. As shown, UE 250 includes a physical layer 252 in communication with physical layer 215 of the protocol stack 232 of the NB 200, a MAC layer 254, an RLC 256, a PDCP 258, and an RRC 260 in communication with RRC 222 of protocol stack 232 of NB 200.

Figure 3:
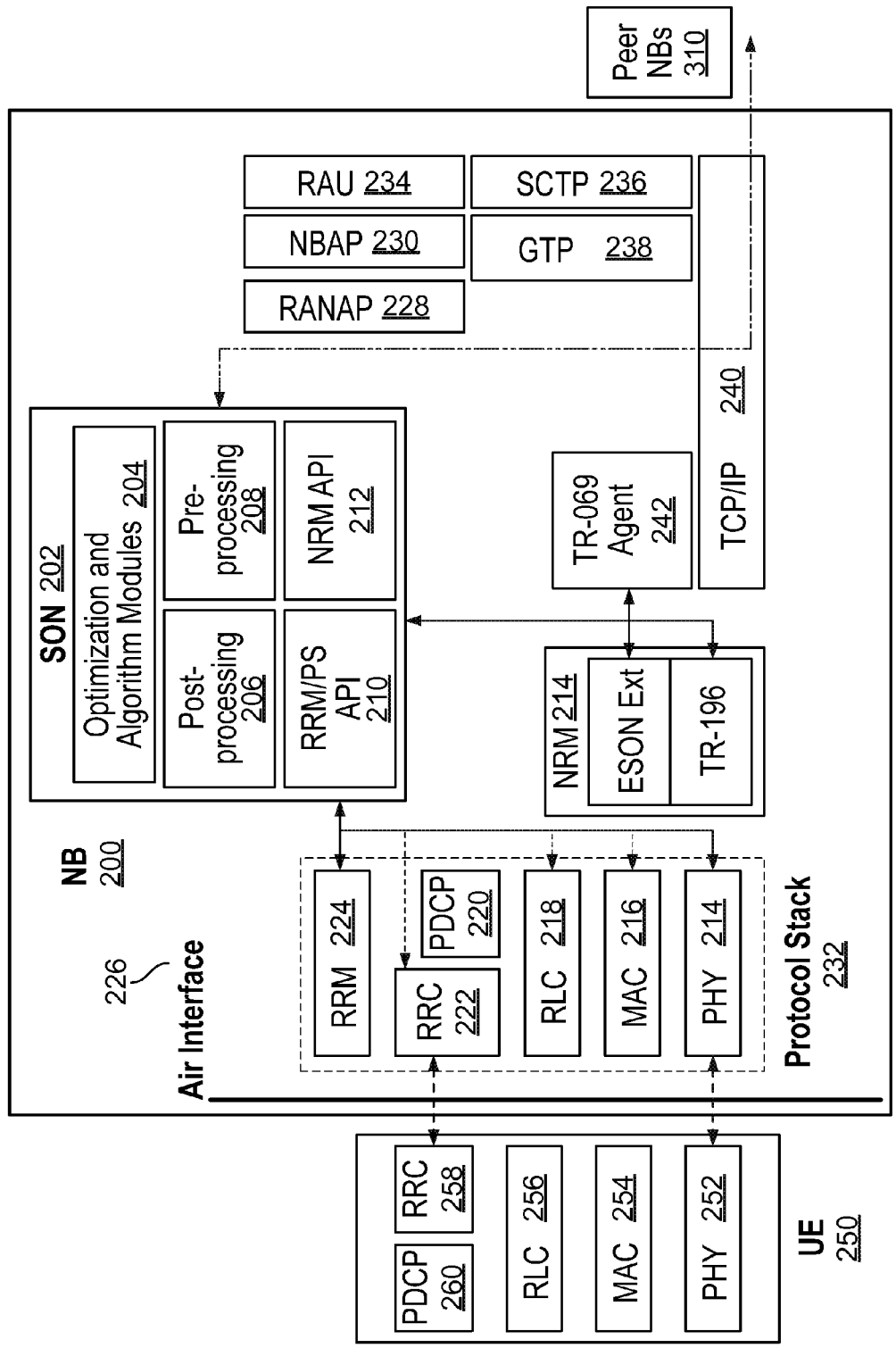
FIG. 3 illustrates 3G UMTS SON APIs for coordinated distributed SON deployment in accordance with some embodiments.

FIG. 3 illustrates 3G UMTS SON APIs for coordinated distributed SON deployment in accordance with some embodiments. In some embodiments, the SON deployment is distributed and coordinates with neighboring NBs and/or eNBs. In particular, FIG. 3 illustrates a SON architecture in which the SON solution is implemented on a 3G NB (e.g., using peer-to-peer techniques) in accordance with some embodiments. In some embodiments, the SON solution for coordinated distributed deployment includes five functional modules and NRM extension as similarly discussed above with respect to the autonomously distributed SON solution as described with respect to FIG. 2. In some embodiments, each functional module performs tasks as those similarly described above with respect to FIG. 2 in autonomous distributed deployment with additional features added to pre-processing and optimization and algorithms modules. In addition to preparing measurement reports and QoS requirements from RRM/PS API module and NRM parameters from NRM API, the pre-processing module exchanges the prepared measurement reports, QoS requirements, and NRM parameters with neighbor NBs, such as peer NBs 310 as shown. In some embodiments, the optimization and algorithms module receives neighbor NB measurement reports, QoS requirements and NRM parameters as additional inputs for inter-cell interference management and network performance optimization. For example, the pre processing module receives neighbor NBs' measurement reports, pre-processed by neighbor NBs' pre-processing modules, and QoS requirements, and then passes this information to the optimization and algorithms modules as part of the inter-cell interference management algorithm inputs. With additional neighbor NBs' measurement reports and QoS requirements, the inter-cell interference management can coordinate the transmit power and duration with its neighbors via post-processing module. For instance, the optimization and algorithms modules of an NB can decide to transmit high power at time slot 1, 3, 6 and 7 to service its cell edge UEs and transmit low power at the other time slots to service its cell center UEs during a next optimization period. Because this information is exchanged via post-processing module, neighbor NBs' optimization and algorithms modules can choose to transmit high power to service their cell edge UEs at different time slots to minimize inter-cell interference at cell edge. When the inter-cell interference is minimized at the cell edge, the throughput will increase at the cell edge. Thus, the network performance is optimized. In addition, this architecture of SON 202 (e.g., using five functional modules) provides a flexible platform that facilitates, for example, the NB to easily migrate from autonomous SON to coordinated distributed SON without requiring any changes to native NB software modules.

Figure 4:
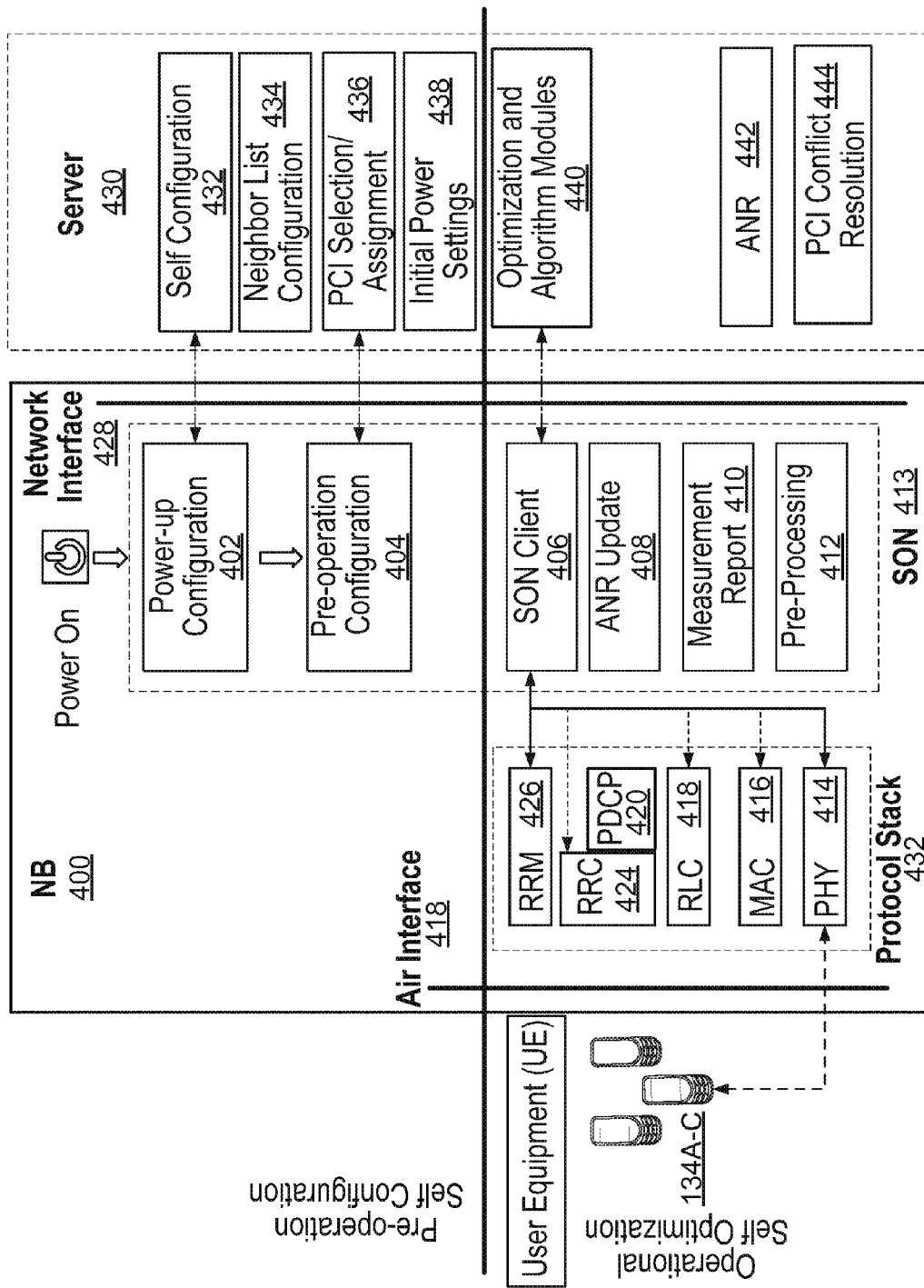
FIG. 4 illustrates a functional diagram of a 3G UMTS implementation architecture for coordinated hybrid SON deployment in accordance with some embodiments.

FIG. 4 illustrates a functional diagram of a 3G UMTS implementation architecture for coordinated hybrid SON deployment in accordance with some embodiments. For example, centralized server based techniques are provided for implementing coordinated hybrid SON deployment. In particular, FIG. 4 illustrates the 3G UMTS system level, coordinated hybrid SON architecture in accordance with some embodiments. FIG. 4 shows how the SON functional modules are split between NB 400 and server 430 in a hybrid deployment in accordance with some embodiments. In a hybrid deployment, the coordination, inter-cell interference management and real-time optimization functional modules are located the server 430 as shown.

As shown in FIG. 4, the NB 400 includes a power-up configuration 402 (e.g., in communication with self-configuration 432 of server 430) and pre-operation configuration 404 (e.g., in communication with PCI selection/assignment 436), which are part of the pre-operation self configuration. The NB 400 also includes SON client 406 (e.g., which is in communication with optimization and algorithm modules 440 of server 430), ANR (Automatic Neighbor Relation) update 408, measurement report 410, and pre-processing 412, which are part of the operational self optimization. The NB 400 also includes a protocol stack 432 in which the various layers of the protocol stack 432, including physical layer 414, MAC layer 416, RLC 418, RRC 424 and RRM 426, are in communication with the SON client 406, as shown in FIG. 4.

As also shown in FIG. 4, the server 430 includes the following: self configuration 432 (e.g., in communication with power-up configuration 402 of NB 400), neighbor list configuration 434, PCI selection/assignment 436 (e.g., in communication with pre-operation configuration 404 of NB 400), and initial power settings 438, which are part of the pre-operation self configuration. The server 430 also includes optimization and algorithm modules 440 (e.g., in communication with SON client 406 of NB 400), ANR (Automatic Neighbor Relation) 443, and PCI conflict resolution 444, which are part of the operational self optimization. In some embodiments, the server 430 performs real-time optimization and generates updated configuration parameters according to measurement reports, QoS requirements and NRM parameters collected from multiple NBs in the same neighbor group. In some embodiments, the updated configuration parameters are sent back to NBs, which implement the updated configuration parameters. In addition, this architecture of SON 202 (e.g., using five functional modules) provides a flexible platform that facilitates, for example, the NB to easily migrate from autonomous SON or coordinated distributed SON to centralized SON by relocating the optimization and algorithm modules to server 430 and duplicating the NRM API module on server 430. For example, on NB 500, the interfaces between SON 502 and NB native software modules can remain the same as those similarly described above in autonomous SON and coordinated distributed SON architectures. Also, the parameter passing between pre-processing modules/post-processing modules and optimization and algorithms modules can utilize the existing management network interface (e.g., TR-069 over TCP/IP). This architecture provides the flexibility to relocate and/or duplicate certain modules without incurring additional new development.

Figure 5:
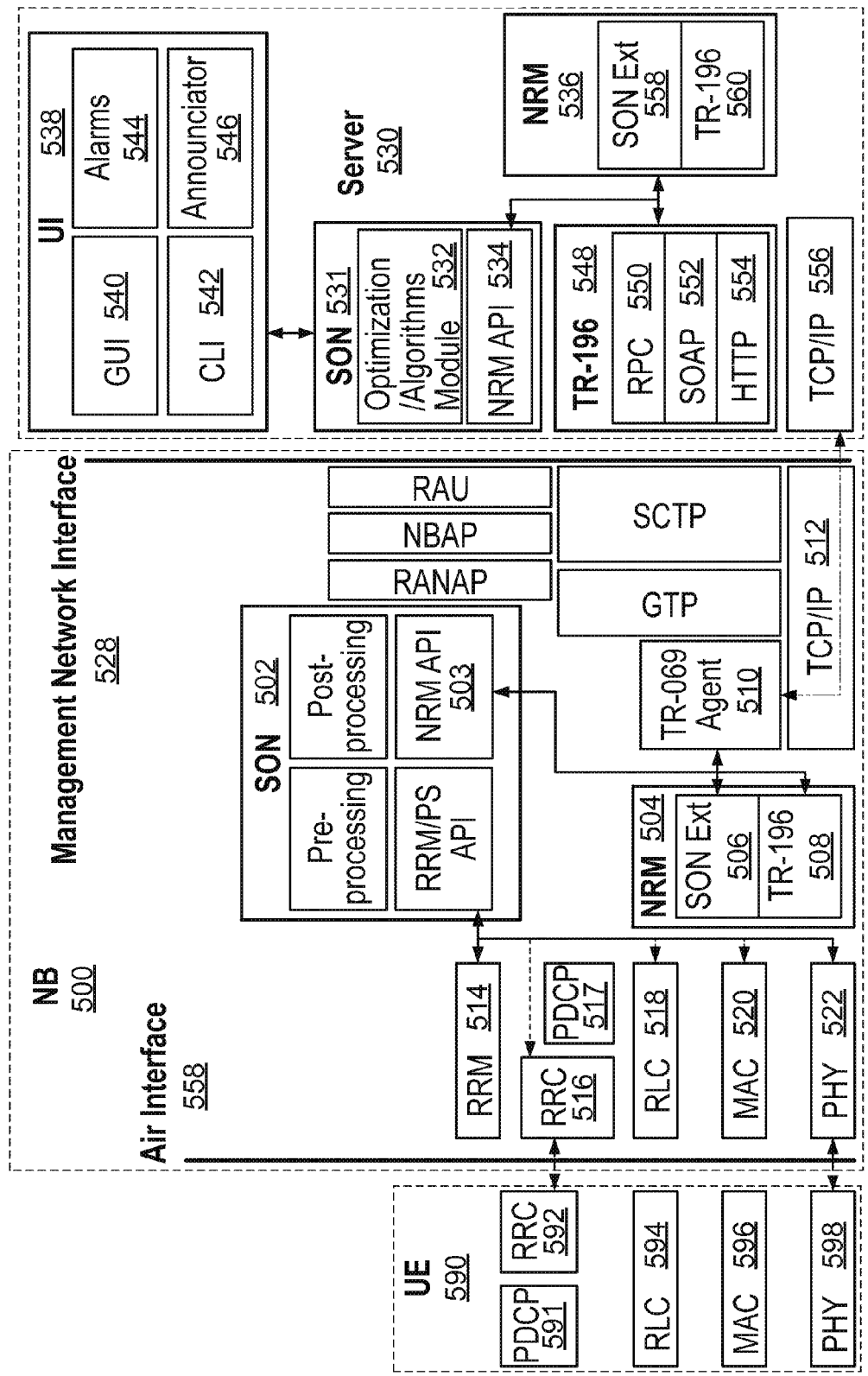
FIG. 5 illustrates 3G UMTS SON APIs for coordinated hybrid SON deployment in accordance with some embodiments.

FIG. 5 illustrates 3G UMTS SON APIs for coordinated hybrid SON deployment in accordance with some embodiments. In some embodiments, a SON server 530 in the hybrid deployment is implemented as stand-alone network management equipment for performing SON specific tasks. For example, centralized server based techniques can be provided for implementing coordinated hybrid SON deployment. In particular, FIG. 5 illustrates the architecture in detail in which the SON solution is implemented on a 3G NB 500 and a stand-alone SON server 530 in accordance with some embodiments. As shown, optimization and algorithms module 532 is located on the server 530 within the SON modules 531 as shown, instead of on the NB 500, and the NRM module 536, which includes SON Ext 558 and TR-196 560, and NRM API 534, within the SON modules 531, are replicated from the NB 500.

As shown, the NB 500 is in communication with UE 590 via an air interface 558 (e.g., using 3G cellular communications), and the NB 500 is in communication with the server 530 via a management network interface 528 (e.g., TR-069 over TCP/IP). In particular, the NB 500 includes a network communication stack that includes RRM layer 514, RRC layer 516 (e.g., in communication with RRC layer 592 of UE 590 as shown), PDCP layer 517, RLC layer 518, MAC layer 520, and PHY layer 522 (e.g., in communication with PHY layer 598 of UE 590 as shown). The NB 500 includes SON modules 502, including pre-processing modules, post-processing modules, RRM/PS API(s) for network communications as shown, and NRM API 503 for communication with NRM 504 as shown (e.g., which includes SON Ext 506 and TR-196 508 as shown). The NB 500 also includes a TR-069 agent 510 for performing TCP/IP communications with the server 530 via TCP/IP communications layer 512 of the NB 500 and TCP/IP communications layer 556 of the server 530 as shown. As also shown, the server 530 includes TR-196 548 that for providing communications with SON modules 531 and NRM 536 as shown, and includes standard communication layers for RPC 550, SOAP 552, and HTTP 554 as shown. As also shown, User Interface (UI) modules 538 are implemented on the server 530 to provide, for example, better usability. As shown UI modules 538 include a Graphical User Interface (GUI) 540, Command Line Interface (CLI) 542, alarms 544, and Announciator 546.

Figure 6:
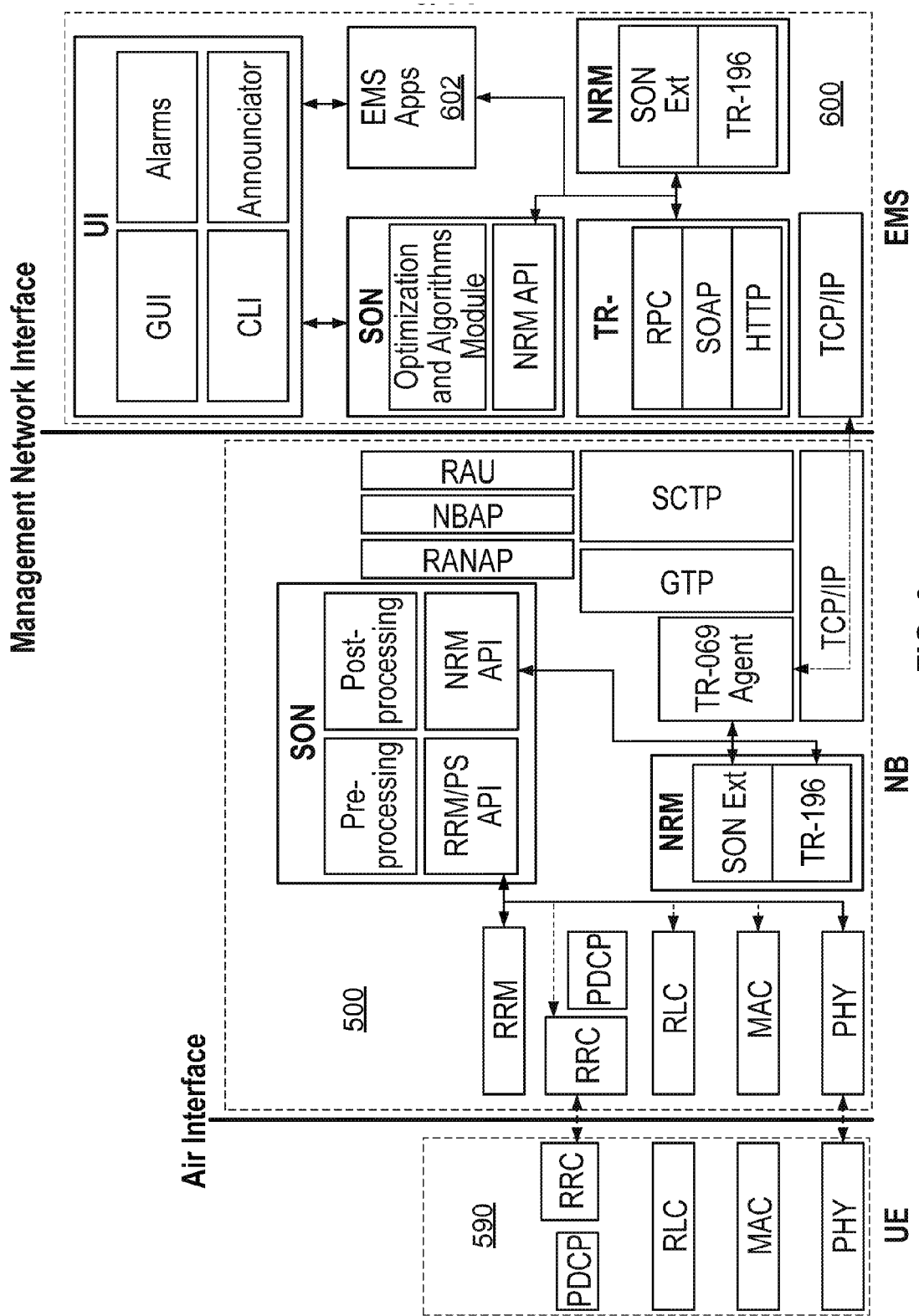
FIG. 6 illustrates 3G UMTS SON APIs for coordinated hybrid SON deployment when a SON server is integrated with an Element Management Server (EMS) in accordance with some embodiments.

In other embodiments, the SON server is integrated with other network equipment (e.g., EMS or HNB gateway) such that some of the functional modules (e.g., NRM module) can be shared. FIG. 6 illustrates 3G UMTS SON APIs for coordinated hybrid SON deployment when a SON server is integrated with an Element Management Server (EMS) in accordance with some embodiments. For example, the server functionality described above with respect FIGS. 4 and 5 can be integrated into an existing network element, such as the EMS 600. In particular, FIG. 6 illustrates the architecture in detail such that the SON server is integrated with EMS 600 in accordance with some embodiments. As shown EMS 600 includes functional modules similar to those shown and described above with respect to FIG. 5, and EMS 600 further includes EMS apps 602. For example EMS apps 602 can include NB configuration functions (e.g., cell setup, channel configuration, etc.). As similarly described above with respect to FIG. 5, optimization and algorithms module is relocated to the EMS, and NRM API is duplicated on the EMS. The parameter passing between pre-processing/post-processing modules and optimization and algorithms module utilizes the existing logical management network interface (e.g., TR-069 over TCP/IP). Accordingly, the flexibility of this architecture allows for some of the modules to be relocated or duplicated into an existing network management server (e.g., EMS) quickly without incurring any additional development.

Figure 7:
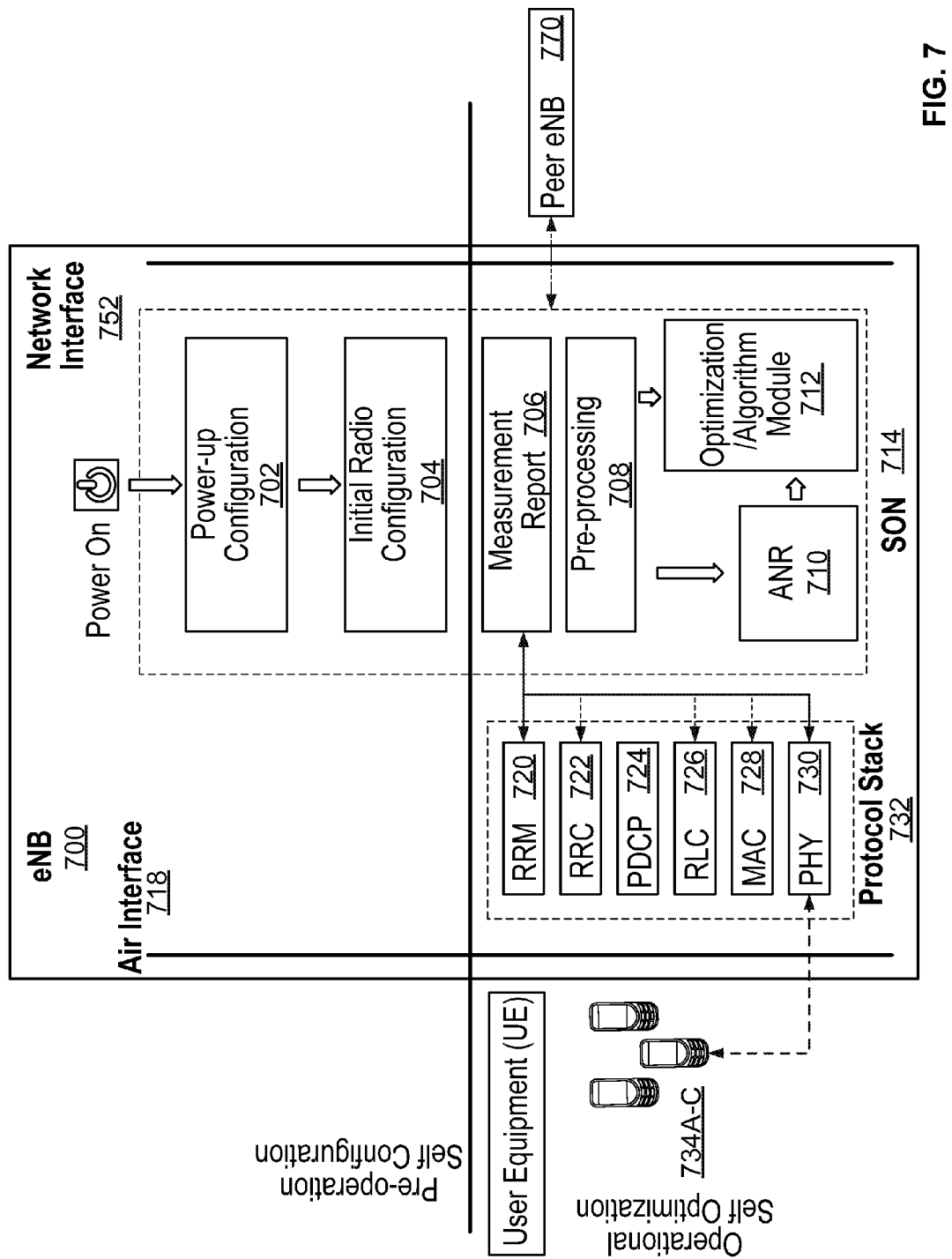
FIG. 7 illustrates a functional diagram of a 4G UMTS implementation architecture for coordinated distributed SON deployment in accordance with some embodiments.

FIG. 7 illustrates a functional diagram of a 4G UMTS implementation architecture for coordinated distributed SON deployment in accordance with some embodiments. In particular, FIG. 7 illustrates the 4G UMTS system level coordinated distributed SON architecture (e.g., using peer-to-peer coordination techniques) in accordance with some embodiments. In particular, the SON functional module 714 in eNB 700 coordinates with neighbor eNBs (e.g., peer eNB 770) via its network interface 752 by exchanging measurement reports, QoS requirements, and NRM parameters as similarly discussed above with respect to various 3G architectures and embodiments.

In particular, FIG. 7 illustrates various SON functional modules 714 implemented and integrated on the eNB 700 interfacing with the protocol stack 732 of the eNB software. As shown, the SON functional modules 714 are divided into two functional states—pre-operation self-configuration and operational self-optimization. During the pre-operation self-configuration state, the SON functional modules power-up configuration 702 and initial radio configuration 704 handle initial power up configuration for the eNB including, for example, backhaul link setup, transport network configuration, and radio network configuration (e.g., PCI conflict resolution, transmit power, etc.). Upon completing the pre-operation self-configuration, the SON functional modules 714 enter an operational self-optimization state. During the operational self-optimization state, the SON functional modules measurement report 706, pre-processing 708, ANR 710, and optimization and algorithm functional modules 712 performs real-time optimization by, for example, receiving various measurement reports and QoS requirements (e.g., from other eNBs (e.g., peer eNB 700) and/or user equipments (UEs)), generating updated configuration parameters per optimization algorithms, and applying optimized configuration parameters. Similar to 3G coordinated distributed SON architecture described above, in some embodiments, measurement report 706 collects measurement reports from RRM 720 and MAC 728 and passes them to pre-processing module 708. Pre-processing module 708 performs pre-process (e.g., smoothing) on the measurement reports and then passes this information to its neighbors listed in a neighbour relation table maintained by ANR 710. In addition, pre-processing module also collects pre-processed measurement reports from its neighbors. Once pre-processing module collects all the pre-processed measurement reports from its neighbors, it passes this information along with its own measurement report(s) to the optimization and algorithms module to compute the optimized configuration parameters that provide sufficient data throughput to serve UEs attached to the eNB and generate the least amount of inter-cell interference to its neighbors. Exchanging measurement reports among neighbors provides each eNB neighbors' radio and channel condition, which enables the optimization and algorithms modules to generate parameters optimized for itself and neighbors (e.g., neighbor base stations).

As also shown in FIG. 7, eNB 700 includes protocol stack 732. In some embodiments, the protocol stack 732 includes a physical layer 730, a MAC layer 728, an RLC (Radio Link Control) layer 726, a PDCP (Packet Data Convergence Protocol) layer 724, an RRC (Radio Resources Control) layer 722, and an RRM (Radio Resources Manager) layer 720. As shown, RRM 120, RRC 122, RLC 126, MAC 128, and PHY 130 layers can each be in communication with the measurement report 706 of the SON functional modules 714. As also shown, eNB 700 includes an AIR interface 718 for communication with User Equipment (UE) 734A-C, and eNB 700 also includes a network interface 752 for communication with peer eNBs, such as peer eNB 770.

Figure 8:
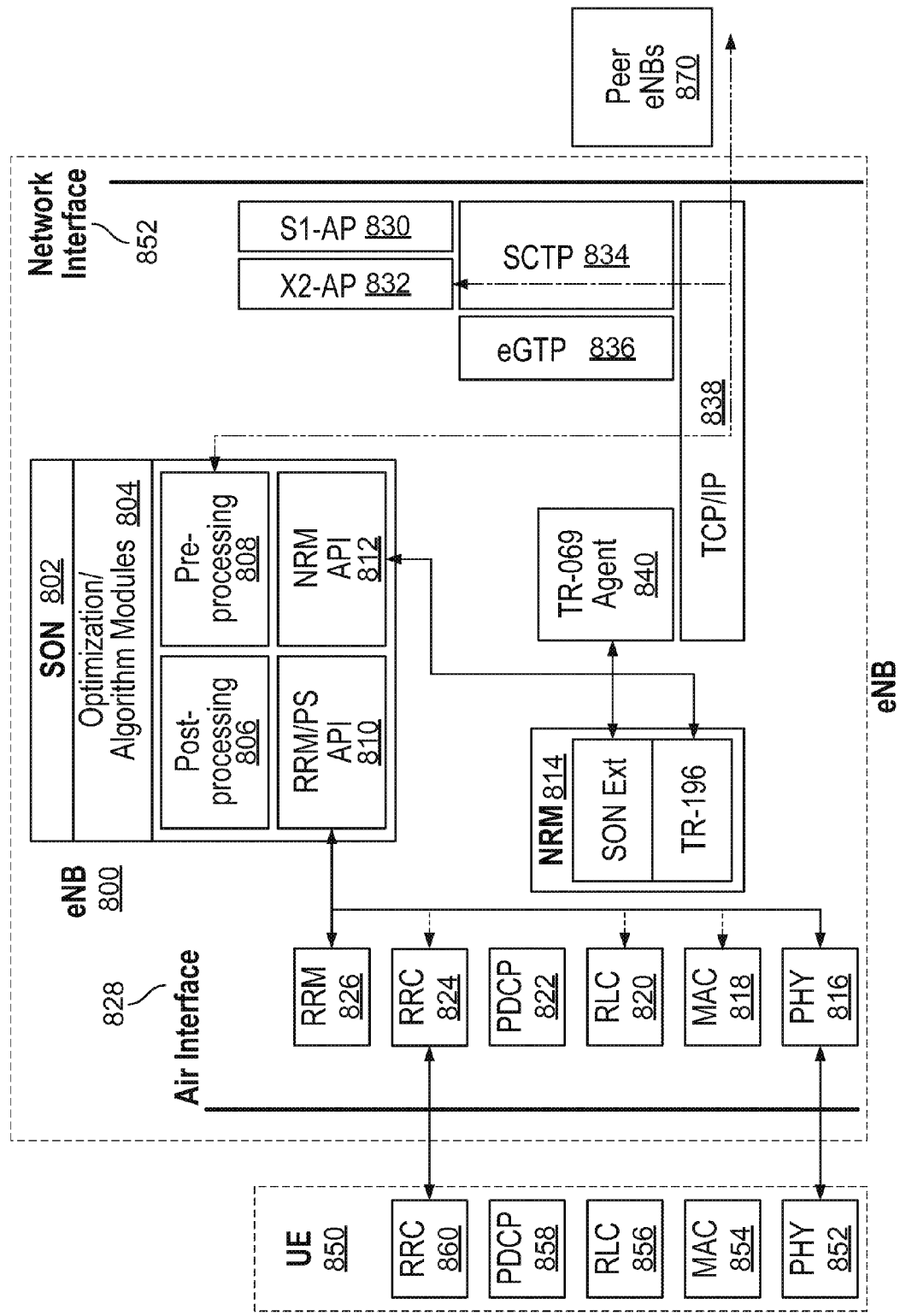
FIG. 8 illustrates 4G UMTS SON APIs for coordinated distributed SON deployment in accordance with some embodiments.

FIG. 8 illustrates 4G UMTS SON APIs for coordinated distributed SON deployment in accordance with some embodiments. In particular, FIG. 8 illustrates the architecture in detail in which the SON solution is implemented in 4G eNB 800 (e.g., using peer-to-peer techniques) in accordance with some embodiments. In some embodiments, the SON solution for coordinated distributed deployment includes five functional modules and NRM extension as similarly discussed above with respect to the distributed SON solution for NB (e.g., 3G implementations) as described with respect to FIG. 3. As shown, the five functional modules of SON 802 include optimization and algorithm modules 804, a Radio Resource Management/Protocol Stack (RRM/PS) API module 810, pre processing module 808, post processing module 806, and NRM API 812. In some embodiments, the RRM/PS API module 810 handles all the interaction between SON 802 and the Radio Resource Management (RRM) 826 and the Protocol Stack (e.g., RRM layer 826, RRC layer 824, PDCP layer 822, RLC layer 820, MAC layer 818, and PHY layer 816) of eNB 800, such as measurement configuration, retrieving measurement reports and QoS requirements, radio resource constraints configuration, and various other functions and interactions. In some embodiments, the pre-processing module 808 prepares measurement reports and QoS requirements from the RRM/PS API module 810 as well as NRM parameters from the NRM API 812. In some embodiments, the optimization and algorithms module 804 performs various optimization procedures by exercising optimization algorithms on pre-processed measurement reports, QoS requirements, and NRM parameters from the pre-processing module 808. In some embodiments, the post-processing module 806 uses the results from the optimization and algorithms modules 804, formats such results in forms of radio resource constraints and configuration parameters, and then delivers the formatted results to corresponding protocol stack modules and the NRM API module 812. In some embodiments, the NRM API module 812 handles access for SON to an NRM data store 814 (e.g., NRM database). In some embodiments, the NRM database access includes standardized NRM (e.g., TR-196) and NRM extension (e.g., proprietary parameters) in communication with TR-069 agent 840, as shown.

As also shown in FIG. 8, eNB 200 includes S1-AP (S1 Application Protocol) 830, X2-AP (X2 Application Protocol) 832, SCTP (Stream Control Transmission Protocol) 834, eGTP (Evolved GPRS Tunneling Protocol) 836, TCP/IP 838, and TR-069 agent 840. In particular, as shown, X2-AP 832 is a standardized 4G interface that facilitates peer-to-peer communications. In some embodiments, X2-AP 832 is used for implementing peer-to-peer communications to facilitate coordinated distributed SON deployment using various techniques described herein. For example, the pre-processing module can utilize the X2-AP 832 vendor specific field to pass its pre-processed measurement reports to its neighbors instead of using TCP/IP. Because X2-AP 832 is 3GPP standardized logical interface and is already connected to its neighbors, there is no additional setup or configuration needed to establish separate links with neighbors to pass the pre-processed measurement reports and/or optimized parameters. In addition, X2-AP 832 encapsulates the pre-processed measurement reports with X2-AP headers filled with proper neighbor eNB destination addresses and then passes them to SCTP 834. SCTP puts X2-AP packets into corresponding streams and dispatches them to TCP/IP 838 to be routed to their destinations.

As also shown, eNB 800 includes an AIR interface 828 for communication with UEs, such as shown, UE 850. As shown, UE 850 includes a physical layer 852 in communication with physical layer 816 of the protocol stack of the eNB 800, a MAC layer 854, an RLC 856, a PDCP 858, and an RRC 860 in communication with RRC 824 of the protocol stack 232 of eNB 800.

In addition to preparing measurement reports and QoS requirements from RRM/PS API module and NRM parameters from NRM API, the pre-processing module exchanges the prepared measurement reports, QoS requirements, and NRM parameters with neighbor NBs, such as peer NBs 870 via network interface 852 using TCP/IP 838 as shown. In some embodiments, the optimization and algorithms module receives neighbor NB measurement reports, QoS requirements and NRM parameters as additional inputs for inter-cell interference management and network performance optimization. Similar to the advantages described above with respect to FIG. 7, receiving neighbor NB measurement reports, QoS requirements, and NRM parameter(s) as additional inputs provides eNB neighbors' radio and channel condition, which enables the optimization and algorithms modules to generate parameters optimized for itself and neighbors (e.g., neighbor base stations) that provides sufficient data throughput to serve UEs attached to the eNB and generated a reduced amount (e.g., the least amount) of inter-cell interference to the neighbors.

Figure 9:
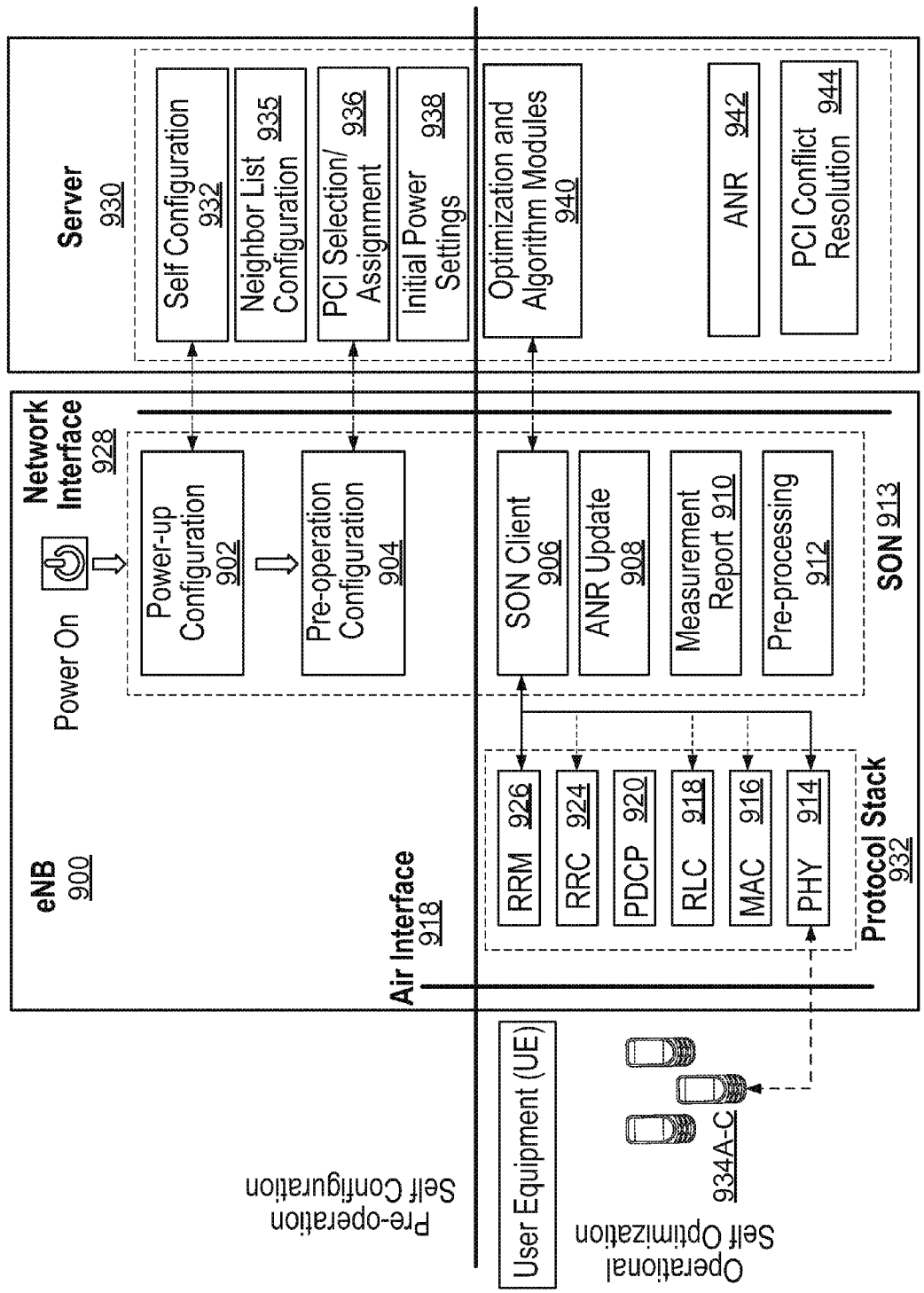
FIG. 9 illustrates a functional diagram of a 4G UMTS implementation architecture for coordinated hybrid SON deployment in accordance with some embodiments.

FIG. 9 illustrates a functional diagram of a 4G UMTS implementation (e.g., system level) architecture for coordinated hybrid SON deployment in accordance with some embodiments. For example, centralized server based techniques are provided for implementing coordinated hybrid SON deployment. In particular, FIG. 9 shows how the SON functional modules are split between eNB 900 and server 930 in hybrid deployment. In hybrid deployment, the coordination, inter-cell interference management and real-time optimization functional modules are located on the server 930 as shown.

As shown in FIG. 9, the eNB 900 includes a power-up configuration 902 (e.g., in communication with self-configuration 932 of server 930) and pre-operation configuration 904 (e.g., in communication with PCI selection/assignment 936 of server 930), which are part of the pre-operation self configuration. The eNB 900 also includes SON client 906 (e.g., which is in communication with optimization and algorithm modules 940 of server 930), ANR update 908, measurement report 910, and pre-processing 912, which are part of the operational self optimization. The eNB 900 also includes a protocol stack 932 in which the various layers of the protocol stack 932, including physical layer 914, MAC layer 916, RLC 918, RRC 924, and RRM 926, are in communication with the SON client 906, as shown in FIG. 9.

Figure 10:
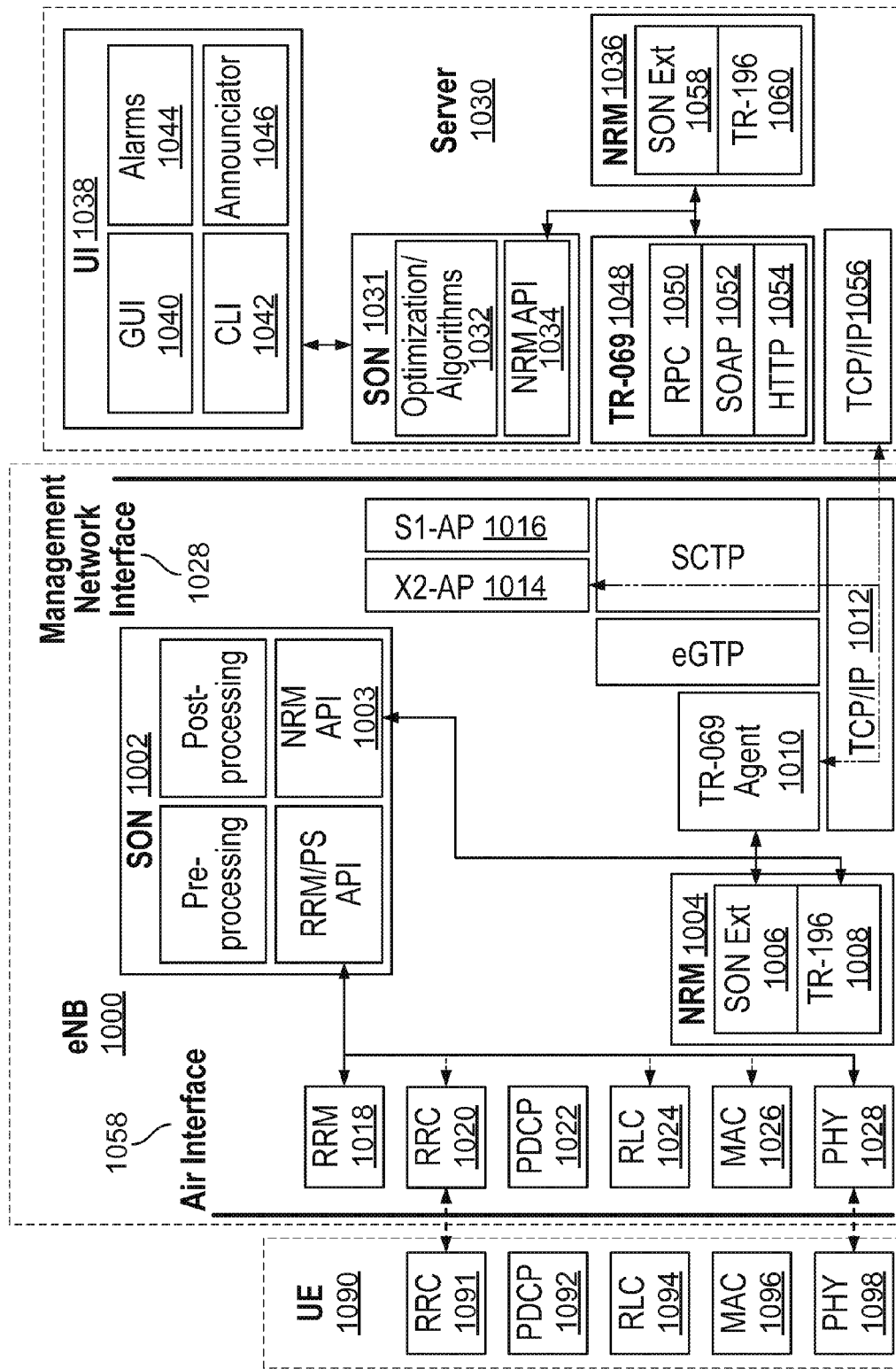
FIG. 10 illustrates 4G UMTS SON APIs for coordinated hybrid SON deployment in accordance with some embodiments.

As also shown in FIG. 9, the server 930 includes the following: self configuration 932 (e.g., in communication with power-up configuration 902 of eNB 900), neighbor list configuration 935, PCI selection/assignment 936 (e.g., in communication with pre-operation configuration 904 of eNB 900), and initial power settings 938, which are part of the pre-operation self configuration. The server 930 also includes optimization and algorithm modules 940 (e.g., in communication with SON client 906 of eNB 900), ANR 942, and PCI conflict resolution 944, which are part of the operational self optimization. In some embodiments, the server 930 performs real-time optimization and generates updated configuration parameters according to measurement reports, QoS requirements and NRM parameters collected from multiple NBs in the same neighbour group (e.g., cluster). In some embodiments, the updated configuration parameters are sent back to eNBs, which implement the updated configuration parameters. For example, because the server 930 performs pre-operation self configuration services to many eNBs, the server 930 can coordinate the configuration parameters to avoid or minimize the conflicts (e.g., PCI) or interference initially. Once the eNB enters the operational self optimization phase, the eNB begins to exchange measurement reports and parameters with its neighbors and executes optimization algorithms (e.g., in real-time). FIG. 10 further illustrates the flexibility of this architecture (e.g., using five functional modules) for implementing coordinated hybrid SON techniques as described herein.

In some embodiments, the SON server in the hybrid deployment is implemented as stand-alone network management equipment for SON specific tasks. FIG. 10 illustrates 4G UMTS SON APIs for coordinated hybrid SON deployment in accordance with some embodiments. For example, centralized server based techniques can be provided for implementing coordinated hybrid SON deployment. In particular, FIG. 10 illustrates the architecture in detail in which the SON solution is implemented on a 4G eNB 1000 and a stand-alone SON server 1030 in accordance with some embodiments. As shown, optimization and algorithms module 1032 is located in SON modules 1031 on the server 1030, instead of on eNB 1000, and the NRM module and NRM API are replicated from the eNB 1000, as further described below. In addition, UI modules 1038 are implemented on the server to provide better usability, as further described below.

As shown, the eNB 1000 is in communication with UE 1090 via an air interface 1058 (e.g., using 4G cellular communications), and the eNB 1000 is in communication with the server 1030 via a management network interface 1028 (e.g., TR-069 over TCP/IP). In particular, the eNB 1000 includes a network communication stack that includes RRM layer 1018, RRC layer 1020 (e.g., in communication with RRC layer 1091 of UE 1090 as shown), PDCP layer 1022, RLC layer 1024, MAC layer 1026, and PHY layer 1028 (e.g., in communication with PHY layer 1098 of UE 1090 as shown). The eNB 1000 includes SON modules 1002, including pre-processing modules, post-processing modules, RRM/PS API(s) for network communications as shown, and NRM API 1003 for communication with NRM 1004 as shown (e.g., which includes SON Ext 1006 and TR-196 1008 as shown). The eNB 1000 also includes a TR-069 agent 1010 for performing TCP/IP communications with the server 1030 via TCP/IP communications layer 1012 of the eNB 1000 and TCP/IP communications layer 1056 of the server 1030 as shown. As also shown, the server 1030 includes TR-196 1048 that for providing communications with SON modules 1031 and NRM 1036 as shown, and includes standard communication layers for RPC 1050, SOAP 1052, and HTTP 1054 as shown. As also shown, User Interface (UI) modules 1038 are implemented on the server 1030 to provide, for example, better usability. As shown UI modules 1038 include a Graphical User Interface (GUI) 1040, Command Line Interface (CLI) 1042, alarms 1044, and Announciator 1046.

In some embodiments, X2-AP 1014 is used for communicating with the server 1030 to facilitate centralized server based for implementing coordinated hybrid SON deployment. In addition and/or alternatively, S1-AP 1016 can be used to facilitate communicating with the server 1030 to facilitate centralized server based for implementing coordinated hybrid SON deployment. For example, the pre-processing module can utilize the S1-AP 1016 vendor specific field to pass its pre-processed measurement reports to the server 1030 instead of using TCP/IP or TR-069 over TCP/IP. Because S1-AP 1016 is a 3GPP standardized logical interface and is already connected to its neighbors, there is no additional setup or configuration needed to establish separate links with neighbors to pass the pre-processed measurement reports and/or optimized parameters. S1-AP 1016 also encapsulates the pre-processed measurement reports with S1-AP headers filled with proper neighbor eNB destination addresses and then passes them to SCTP. In addition, SCTP puts X2-AP packets into corresponding streams and dispatches them to TCP/IP 838 to be routed to their destinations. The server 1030 executes the optimization algorithms upon receiving the measurement reports and parameters. Then, the server 1030 sends the optimized parameters back to individual eNBs via S1-AP vendor specific fields. Accordingly, the flexibility of this architecture (e.g., using five functional modules) allows for some of the modules (e.g., optimization 1032 and algorithms module and NRM API 1034) to be relocated or duplicated from the eNB to a server (e.g., server 1032) quickly without incurring any additional development.

Figure 11:
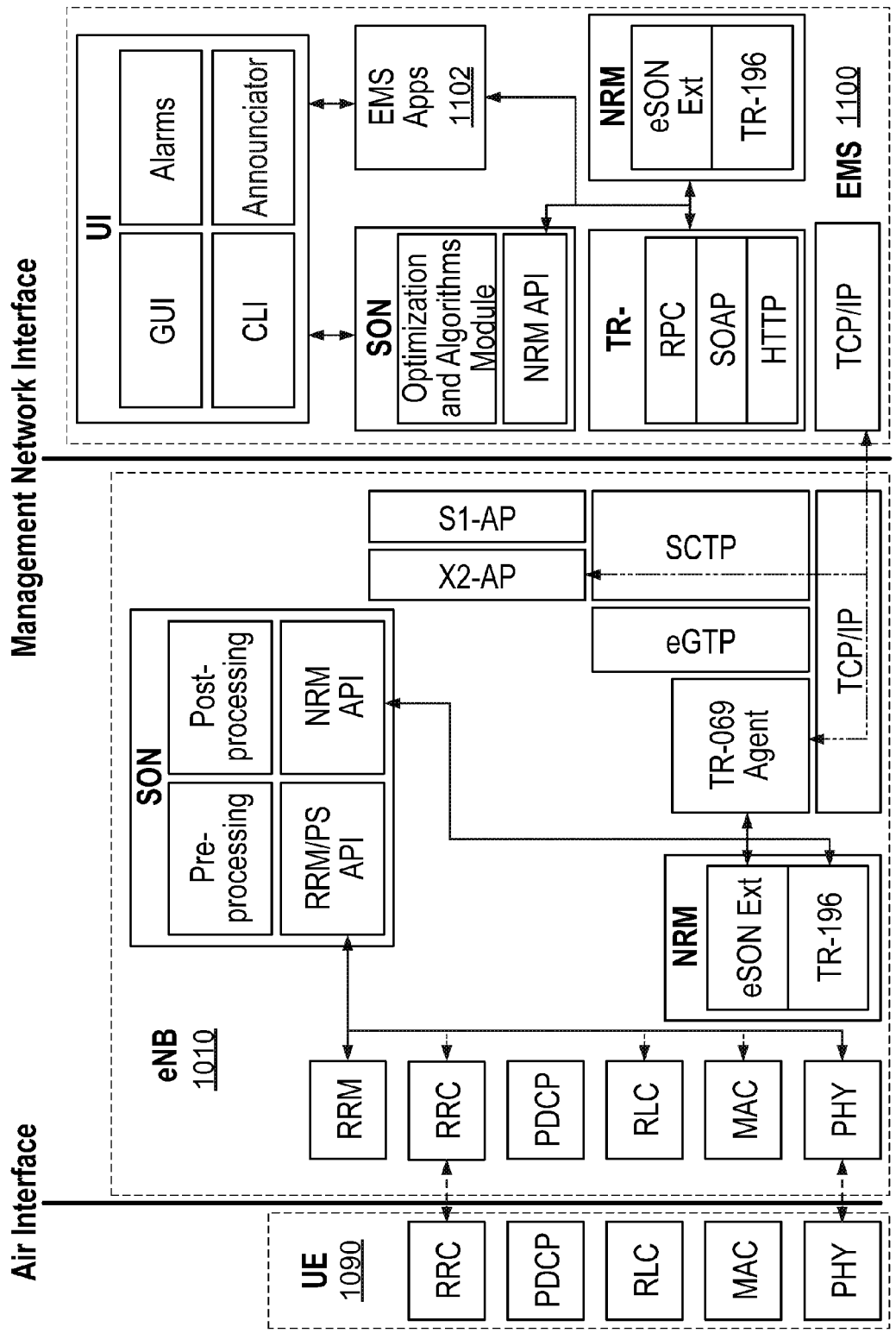
FIG. 11 illustrates 4G UMTS SON APIs for coordinated hybrid SON deployment when SON server is integrated with EMS in accordance with some embodiments.

In other embodiments, the SON server is integrated with other network equipment, e.g., EMS or MME, such that some of the functional modules, e.g., NRM module, can be shared. FIG. 11 illustrates 4G UMTS SON APIs for coordinated hybrid SON deployment when SON server is integrated with EMS in accordance with some embodiments. For example, the server functionality described above with respect FIGS. 9 and 10 can be integrated into an existing network element, such as the EMS 1100. In particular, FIG. 11 illustrates the architecture in detail such that the SON server is integrated with EMS 1100 in accordance with some embodiments. As shown, EMS 1100 includes functional modules similar to those shown and described above with respect to FIG. 10, and EMS 1100 further includes EMS apps 1102. For example EMS apps 1102 can include pre-operation self-configuration functions (e.g., transport configuration, neighbor list, PCI). Because the optimization and algorithms module and EMS apps reside in the same platform, the EMS apps can take advantage of the available advanced algorithms when a new eNB is deployed in a neighborhood during the pre-operation self-configuration phase. Accordingly, using these techniques can minimize the ripple effects to the existing wireless network due to new eNB deployment.

Having now fully described the inventive subject matter, it will be appreciated by those skilled in the art that the same can be performed within a wide range of equivalent modifications, variations and adaptations without departing from the scope patent disclosure.

While this disclosure has been described in connection with specific embodiments thereof, it will be understood that it is capable of further modifications. This application is intended to cover any variations, uses, or adaptations of the disclosure following, in general, the principles of the disclosure and including such departures from the present disclosure as come within known or customary practice within the art to which the disclosure pertains and as may be applied to the essential features hereinbefore set forth.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor of a base station configured to:
receive a Quality of Service (QoS) requirement associated with a user equipment (UP;
autonomously perform a pre-operation self-configuration, comprising performing a measurement report; and
autonomously perform an operation self-optimization, comprising:
generate at least one configuration parameter per an optimization algorithm that includes an amount of time needed per transmit period and an amount of power needed per transmit period, wherein the at least one configuration parameter includes a cell setup parameter, a call reconfiguration parameter, a cell identity parameter, a primary scrambling code parameter, a transmit power parameter, or any combination thereof; and
apply the at least one configuration parameter to satisfy the QoS requirement, comprising to:
update the at least one configuration parameter; and
send the at least one configuration parameter to a protocol stack of the base station that communicates with the user equipment; and
a memory coupled to the processor and configured to provide the processor with instructions.

2. The system recited in claim 1, wherein the processor is further configured to:
determine a Received Signal Strength Indicator (RSSI) and a Channel Quality Indicator (CQI), wherein the at least one configuration parameter is generated using the RSSI, the CQI, and the measurement report.

3. The system recited in claim 1, wherein the processor is further configured to:
perform a power-up configuration during the pre-operation self-configuration.

4. The system recited in claim 1, wherein the processor is further configured to:
perform an initial radio configuration during the pre-operation self-configuration.

5. The system recited in claim 1, wherein the processor is further configured to:
perform one or more optimizations during the operation self-optimization using the measurement report.

6. A method, comprising:
receiving a Quality of Service (QoS) requirement associated with a user equipment (UE);

autonomously performing, using a processor, a pre-operation self-configuration, comprising performing a measurement report; and autonomously performing, using the processor, an operation self-optimization, comprising:
- generating at least one configuration parameter per an optimization algorithm that includes an amount of time needed per transmit period and an amount of power needed per transmit period, wherein the at least one configuration parameter includes a cell setup parameter, a call reconfiguration parameter, a cell identity parameter, a primary scrambling code parameter, a transmit power parameter, or any combination thereof; and
- applying the at least one configuration parameter to satisfy the QoS requirement, comprising:
  - updating the at least one configuration parameter; and
  - sending the at least one configuration parameter to a protocol stack that communicates with the user equipment.

7. The method of claim 6, further comprising:
determining a Received Signal Strength Indicator (RSSI) and a Channel Quality Indicator (CQI), wherein the at least one configuration parameter is generated using the RSSI, the CQI, and the measurement report.

8. The method of claim 6, further comprising:
performing a power-up configuration during the pre-operation self-configuration.

9. The method of claim 6, further comprising:
performing an initial radio configuration during the pre-operation self-configuration.

10. The method of claim 6, further comprising:
performing one or more optimizations during the operation self-optimization using the measurement report.

11. A computer program product, the computer program product being embodied in a tangible non-transitory computer readable storage medium and comprising computer instructions for:
- receiving a Quality of Service (QoS) requirement associated with a user equipment (UE);
- autonomously performing a pre-operation self-configuration, comprising performing a measurement report; and
- autonomously performing an operation self-optimization, comprising:
  - generating at least one configuration parameter per an optimization algorithm that includes an amount of time needed per transmit period and an amount of power needed per transmit period, wherein the at least one configuration parameter includes a cell setup parameter, a call reconfiguration parameter, a cell identity parameter, a primary scrambling code parameter, a transmit power parameter, or any combination thereof; and
  - applying the at least one configuration parameter to satisfy the QoS requirement, comprising:
    - updating the at least one configuration parameter; and
    - sending the at least one configuration parameter to a protocol stack that communicates with the user equipment.

12. The computer program product recited in claim 11, further comprising computer instructions for:
determining a Received Signal Strength Indicator (RSSI) and a Channel Quality Indicator (CQI), wherein the at least one configuration parameter is generated using the RSSI, the CQI, and the measurement report.

13. The computer program product recited in claim 11, further comprising computer instructions for:
performing a power-up configuration during the pre-operation self-configuration.

14. The computer program product recited in claim 11, further comprising computer instructions for:
performing an initial radio configuration during the pre-operation self-configuration.

15. The computer program product recited in claim 11, further comprising computer instructions for:
performing one or more optimizations during the operation self-optimization using the measurement report.

16. A system, comprising:
a processor of a base station configured to:
- communicate with a plurality of peer base stations to receive peer-to-peer radio configuration information for implementing a coordinated distributed Self-Organized Network (SON) deployment, comprising:
  - receive a Quality of Service (QoS) requirement associated with a user equipment (UE) and a measurement report from a peer base station;
  - send the measurement report to a SON server;
  - receive, from the SON server, at least one configuration parameter, wherein the at least one configuration parameter includes a cell setup parameter, a call reconfiguration parameter, a cell identity parameter, a primary scrambling code parameter, a transmit power parameter, or any combination thereof; and
  - apply the at least one configuration parameter to satisfy the QoS requirement, comprising to:
    - update the at least one configuration parameter; and
    - send the at least one configuration parameter to the peer base station; and
  - perform an operation self-configuration using the peer-to-peer radio configuration information;
  and
a memory coupled to the processor and configured to provide the processor with instructions.

17. The system recited in claim 16, wherein the measurement report includes a Received Signal Strength Indicator (RSSI) and a Channel Quality Indicator from the peer base station.

18. The system recited in claim 16, wherein the base station is a 4G base station, and wherein the processor is further configured to:
perform peer-to-peer communications using an X2-AP link of the base station.

19. A system, comprising:
a processor of a base station configured to:
- communicate with a Self-Organized Network (SON) server for implementing a coordinated hybrid distributed SON deployment; the deployment, comprising:
  - receive a Quality of Service (QoS) requirement associated with a user equipment (UE) and a measurement report from a peer base station;
  - send the measurement report to the SON server;
  - receive, from the SON server, at least one configuration parameter, wherein the at least one configuration parameter includes a cell setup parameter, a call reconfiguration parameter, a cell identity parameter, a primary scrambling code parameter, a transmit power parameter, or any combination thereof; and
  - apply the at least one configuration parameter to satisfy the QoS requirement, comprising to:
    - update the at least one configuration parameter; and
    - send the at least one configuration parameter to the peer base station; and perform an operation self-configuration using radio configuration information received from the SON server; and a memory coupled to the processor and configured to provide the processor with instructions.

20. The system recited in claim 19, wherein the measurement report includes a Received Signal Strength Indicator (RSSI) and a Channel Quality Indicator from the peer base station.

21. The system recited in claim 19, wherein the base station is a 4G base station, and wherein the processor is further configured to:

perform communications to the SON server using an X2-AP link of the base station.

22. The system recited in claim 19, wherein the base station is a 4G base station, and wherein the processor is further configured to:

perform communications to the SON server using an S1-AP link of the base station.

23. The system recited in claim 19, wherein the SON server is integrated with an Element Management Server (EMS).

* * * * *